(12) United States Patent
Ljubich (10) Patent No.: US 7,178,869 B2
(45) Date of Patent: Feb. 20, 2007

(54) BICYCLE SEAT

(76) Inventor: Paul Ljubich, 203 Ross La., Linwood, NJ (US) 08221

( * ) Notice: Subject to any disclaimer, the term of this patent is extended or adjusted under 35 U.S.C. 154(b) by 0 days.

(21) Appl. No.: 11/127,139

(22) Filed: May 12, 2005

(65) Prior Publication Data

US 2006/0255631 A1 Nov. 16, 2006

(51) Int. Cl.
*B62J 1/00* (2006.01)

(52) U.S. Cl. ............ 297/201; 297/215.13; 297/215.15; 297/312

(58) Field of Classification Search ................ 297/312, 297/337, 195.1, 201, 202, 214, 215.13, 215.14, 297/215.15

See application file for complete search history.

(56) References Cited

U.S. PATENT DOCUMENTS

| | | | |
|---|---|---|---|
| 609,944 A * | 8/1898 | Page ..................... | 297/202 |
| 621,139 A | 3/1899 | Reuter | |
| 622,357 A * | 4/1899 | Hitchcock et al. ......... | 297/201 |
| 629,956 A * | 8/1899 | Craig .................... | 297/201 |
| 635,598 A * | 10/1899 | Rowe .................... | 297/201 |
| 2,801,199 A * | 7/1957 | Meyers .................. | 156/77 |
| 4,387,925 A | 6/1983 | Barker | |
| 4,877,286 A * | 10/1989 | Hobson et al. .......... | 297/215.13 |
| 5,123,698 A | 6/1992 | Hodges | |
| 6,056,356 A | 5/2000 | Unger, Jr. | |
| 6,095,600 A | 8/2000 | Mattingly | |
| 6,209,954 B1 * | 4/2001 | Bombardier ............ | 297/201 |
| 6,290,291 B1 * | 9/2001 | Kojima .................. | 297/201 |
| 6,357,825 B1 | 3/2002 | Bavaresco | |
| 6,402,236 B1 * | 6/2002 | Yates .................... | 297/201 |
| 6,554,355 B2 * | 4/2003 | Kaptur .................. | 297/195.1 |
| 6,575,529 B1 | 6/2003 | Yu | |
| 7,025,417 B2 * | 4/2006 | Cohen ................... | 297/195.1 |

OTHER PUBLICATIONS

N.C.C.M. Moes, "Distance between the Points of Maximum Pressure for Sitting Subjects", International Design Conference-Design 2000, Dubrovnik, May 23, 2000.
C. F. Schroeder et al., "Measuring the Human Pelvis: A Comparison of Direct and Radiographic Techniques Using a Modem United States-Based Sample", Amer. J. of Physical Anthropology, 103:471-479, 1997.
F. Oberpenning et al., "The Alcock Syndrome: Temporary Penile Insensitivity due to Compression of the Pudendal Nerve within the Alcock Canal", The Journal of Urology, vol. 151, 423-425, Feb. 1994.
E. Pavelka, "Uncomfortably Numb", Bicycling, Mar. 1998, vol. 39, issue 2, p. 89-92.
K. S. Taylor, et al., "Using an Experimental Bicycle Seat to Reduce Perineal Numbness", The Physician and Sports Medicine, vol. 30, No. 5, May 2002.

* cited by examiner

*Primary Examiner*—Peter M. Cuomo
*Assistant Examiner*—Sarah B. McPartlin
(74) *Attorney, Agent, or Firm*—Bacon & Thomas (57) ABSTRACT

A bicycle seat assembly having a platform defining two transversely extending wing sections and a forwardly extending horn section, and a pod mounted adjustably on each wing section.

14 Claims, 10 Drawing Sheets

BICYCLE SEAT

TECHNICAL FIELD

The present invention relates to a bicycle seat (saddle) assembly which includes two pods mounted on one of two platforms. The assembly, while developed for a bicycle, can be used with other cycles, such as stationary or exercise cycles, tricycles, unicycles, motorcycles, and the like.

BACKGROUND OF THE INVENTION

Bicycle riding provides pleasure, competition and has the concomitant health benefits of aerobic exercise. The bicycle seat or saddle is a major interface between the rider and the bicycle. It is also the chief support interface between the rider and the bicycle.

Figure 1:
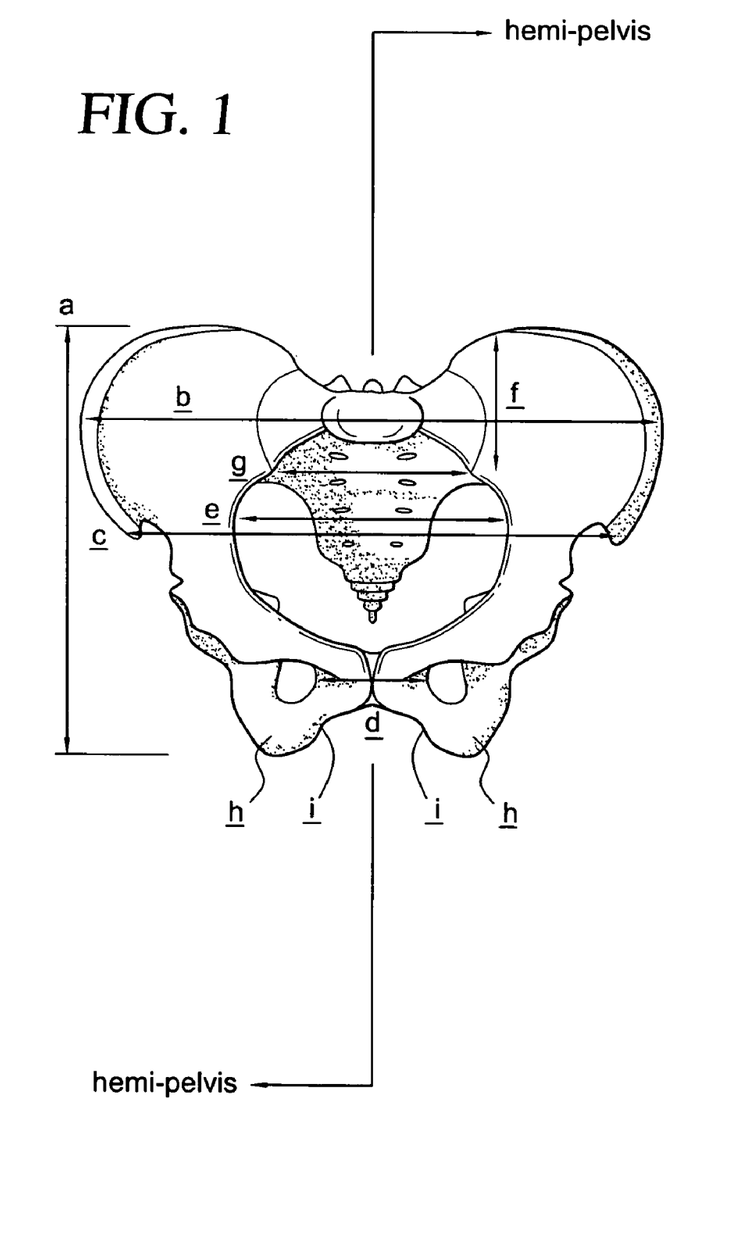
FIG. 1 is a schematic illustration of the bone structure of the human pelvis.

To better appreciate this relationship, reference is made to FIG. 1 which schematically shows the bone structure of the human pelvis. The pelvis is a bony structure located at the base of the human spine. The male and female pelvis differ, but the differences are not significant for purposes of understanding the present invention. References a–g identify various dimensions associated with the pelvis. These are common to both male and female. The pelvis is symmetrical in the width direction, with a identifying the pelvic height, b identifying the pelvic breadth, c identifying the anterior upper spinal breadth, d identifying the breath at the pubic symphysis, e identifying the transverse diameter of the pelvic brim, f identifying the height of the ilium, and g identifying the breath of the Sacro-iliac. The bone areas denoted by h are known as the ishial tuberosities or sit bones, and the bone area designated by i are the ischiopubic rami.

Most of the support occurs between the sit bones and the saddle. Depending on the cyclist's posture some support is provided between the horn of a typical saddle and the pubic symphysis/ischiopubic rami (d and i in FIG. 1). The combination of the sit bones and the pubic symphysis/ischiopubic rami provide a bone span which affords a three pronged support interface between the cyclist and the seat.

Since the seat is the chief support interface between the cyclist and the bicycle, the comfort of the cyclist is important to both the pleasure and safety of riding. The size, shape, flexibility, orientation and slickness of the seat will affect the user. Greater comfort of the rider is paramount since greater pleasure and greater duration of riding is a direct consequence of comfort. This translates into better health benefits and less injury.

Almost all known bicycle saddles have a wider aft portion and a forward horn portion. The wider aft portion engages the sit bones and midline soft tissue. The horn provides support to the pubic symphysis/ischiopubic rami and lateral stability by contacting the medial aspects of the rider's thighs.

The typical bicycle saddle has a convex aft portion to provide some degree of pelvis conformation. Pressure from the aft portion of the saddle can cause injury to the tissues around and adjacent the sit bones most notably the pudenal nerve, artery, & vein and cavernous nerve, artery and vein. See, Oberpenning, F., et. al. The Alcock Syndrome: Temporary Penile Insensitivity due to Compression of the Pudenal Nerve within the Alcock Canal, Journal of Urology, 151: 423–425, 1994, and Pavelka, E. Uncomfortably Numb, Bicycling, 39: 89–92, 1998. Some saddles have been designed to reduce pressure to the softer midline structures by providing a fixed slit or space in the middle of the saddle (along the long axis). See, Taylor K. S., et. al. Using an Experimental Bicycle Seat to Reduce Perineal Numbness, The physician and Sportsmedicine, 30: No. 5, May, 2002. Even with a midline space present, there is no accommodating differences in the distance between the ischial tuberosity or interischial tuberosity distance.

Figure 2A:
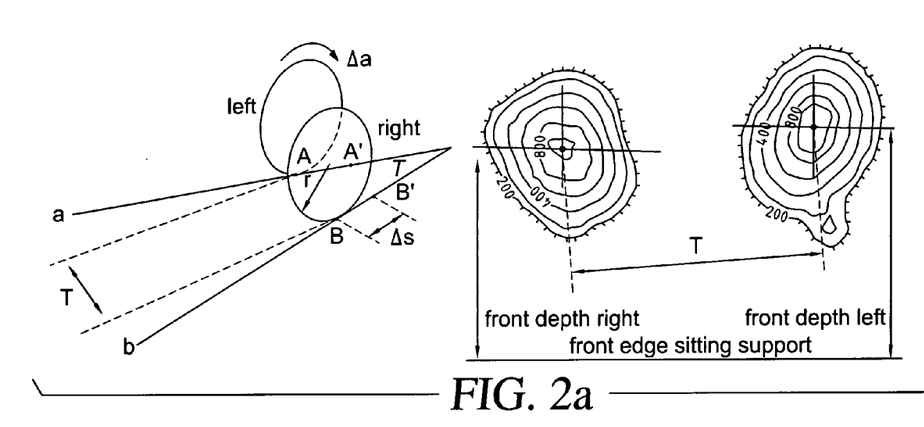
FIGS. 2a and 2b illustrate data derived from International Design Conference—Design 2000, noted above.
Figure 2B:
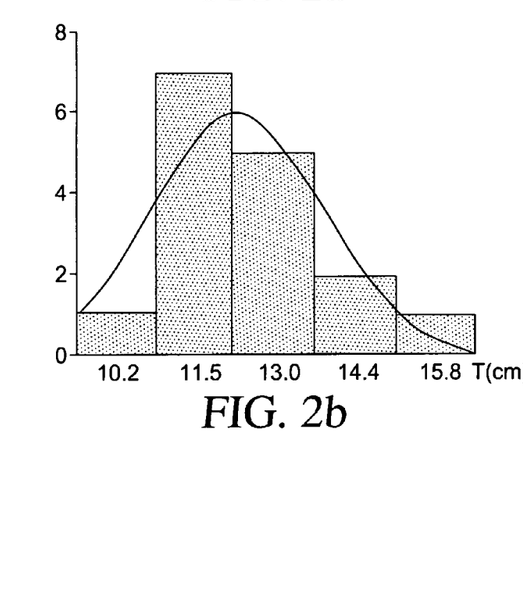

See, Niels C. C. M. Moes, Distance Between the Points of Maximum Pressure for Sitting Subjects, International Design Conference—Design 2000, Dubrovnik, May 23–26, 2000. FIGS. 2a and 2b are a reproduction of FIG. 3 of the noted article. The histogram in FIG. 2b shows the variation in the interischial tuberosity distance T. The contour line picture in FIG. 2a show the maximum pressure points. This lack of accommodation for the interischial tuberosity distance can lead to pressure of midline softer structures, which can still lead to lack of blood flow or pressure trauma to the nerves. Additionally, the midline space found in some saddles does not alleviate pressure to softer tissues trapped between the pubic symphysis/ischiopubic rami and horn. Both the lack of accommodating variability in interischial tuberosity distance and pressure from sandwiching tissues between the horn and pubic symphysis/ischiopubic rami can still lead to genital numbness and penile dysfunction.

A seat for a bicycle is needed, therefore, which not only addresses the difficulties noted above but provides a solution to these difficulties.

SUMMARY OF THE INVENTION

What can be understood from a consideration of the above, is that while the human pelvis has the same basic design for all humans, with the exception that the male and female pelvis differ slightly, they have different sizes. That is, the spacing between the points of the sit bones are not only different for males and females, they are also different amongst males and amongst females. For maximum comfort, it would be desirable to be able to accommodate this difference, and this is what the present invention does by providing the adjustability of the pods.

The present invention provides, therefore, the state-of-the-art with a seat assembly which reduces, if not, eliminates the difficulties noted above and provides maximum comfort to the user. The assembly of the present invention can be utilized on a mobile or stationary bicycle. The assembly is designed to provide support to each hemi-pelvis independently. Each ischial tuberosity (sit bone) is supported by a pod which is conforming to the sit bone, and is adjusted for this purpose. The pods are supported by a specified portion of the platform. The pods are made of silicone, or polyurethane rubber, or carbon fibers, or other similar material which is flexible, durable and conforming. The pods are mounted to the platform in a unique fashion which allows medial, lateral, forward, aft and rotational adjustment (universal adjustment); thereby providing individual support to each hemi-pelvis. The configuration, material composition and adjustment factor of the pods results in an assembly which removes pressure from midline structures such as the pudenal and cavernous nerves, arteries and veins as well as other tributaries to the genitalia. The platforms are made of molded plastic although they can be made of other materials (e.g. metal).

The platforms have a "scooped-out" shape allowing for anterior rotation or roll of the pelvis without applying pressure to the soft tissue structures between the "horn" and pubic symphysis/ischiopubic rami. The soft, flexible consistency of the polyurethane or silicone rubber of the pod allows the pods to conform to the "scooped-out" shape of the platforms when the rider is leaning (anteriorly) over the handlebars. Such a position is more common in racing bicycles.

The platforms are attached to the bicycle seat mounting tube using perpendicular bars which are integral to the platform and an attachment collar connected to the bars.

The seat assembly of the invention is adaptable to the rider in a way not previously possible. The design of the platforms and the ability to adjust the pods on the platform are unique to this bicycle seat.

BRIEF DESCRIPTION OF THE DRAWINGS

Eight figures have been selected to illustrate several preferred embodiments of the invention. These are.

DESCRIPTION OF THE PREFERRED EMBODIMENTS

The seat assembly of each embodiment includes a platform 10, 110, and two-pods 12, 112, per platform, and necessary mounting hardware to mount the pods to the appropriate side (wing) of the platform. The platforms are mounted onto the seat tube (not shown) of the bicycle.

In each embodiment, the platform 10, 110 can be molded as a single piece structure including an aft section defining wings 14, 114 and 16, 116 from which extends a forward section or horn 18, 118. The aft section (posterior) and forward section (anterior) are symmetrical relative to the long axis X—X (centerline).

The platforms 10, 110 can be molded as a plastic part or they can be fabricated of sheet metal with sufficient thickness, or made of other materials, to provide the platform with the necessary stiffness to support the cyclist of any body weight.

Turning to the embodiment illustrated in FIGS. 3–6, each wing 14 and 16 is provided with slots 20 (preferably three) of varying length for pod adjustment. The slots 20 form an angle ω with the centerline X—X. The angle ω is approximately 110°. The diameter of slots 20 are approximately 5/16 in. In that region of the aft section where the two wings are joined, an opening 22 is provided for weight saving. The horn 18 is provided with an elongated slot 24. The slot 24 provides room for perineal structures/genitalia. The horn 18 defines rails 26 and 28 which outline the length of the slot 24. According to one embodiment, the rails 26 and 28 are approximately ½ inch in width, while the width of the slot 24 is approximately 1½–3 inches. The width of the slot 24 is based on accommodating the breadth of the symphysis and contained soft tissue structures of perineum (FIG. 1). The upper surface of the rails 26 and 28 are indicated as surfaces 30 and 32, respectively. These surfaces can contact the most anterior/inferior aspects of the pubic symphysis/ischiopubic rami when a cyclist leans forward and therefore rolls his/her pelvis forward. Contact between the inferior/anterior aspects of the pubic symphysis/ischiopubic rami with surfaces 30, 32 allows for lateral stability, better control of the bicycle and distribution of weight across the ischiotuberosities and anterior aspects of the pelvis.

A pod 12 (FIGS. 3, 4 and 5) is mounted to each wing 14 and 16. Each pod 12 includes a pair of spaced apart threaded bolts 34 which extend outwardly from a flat, bottom surface 36 of the pod. The head 38 of each bolt is embedded in the pod. This can be accomplished when the pods are manufactured, or the pods can be provided with a blind bore with a recess (not shown) at the blind end. In this way the bolt can be inserted in the blind bore with its head end and at the end of the blind bore the head is then slid into the recess.

Figure 5A:
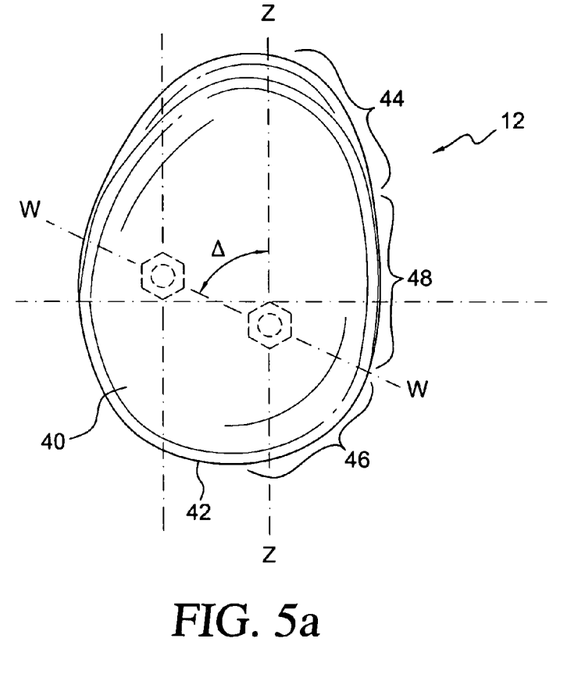
FIGS. 5a, 5b and 5c are end, plane and side views, of a pod according to the present invention.

The pods 12 may be constructed also as a molded part, or as a metal frame with an elastic fill material. In either case the top surface 40 of the pod is contoured. The posterior lip 42 of the top surface 40 allows for posterior stability. A gentle rise can be seen along the medial border of the pods. According to one example, the pods 12 are approximately ¾ to 13/16 inches thick and are made of flexible (although durable) material such as silicone rubber, polyurethane rubber, or similar material. The pods may have a variable hardness. Centrally embedded in each pod are the two ¼ inch bolts 34. Flexibility of the anterior portion 44 (FIG. 5a) of the pods is paramount as it relates to the angle β, discussed below. The posterior portion 46 may have variable flexibility and the central portion 48 is preferably hard so as to fix the bolts. The bolts 34 are, preferably situated at an acute angle Δ as shown in FIG. 5a, which is shown in relation to the long axis Z—Z of the pods and the axis W—W connecting the bolt centers. Preferably, A is 65°.

Figure 3:
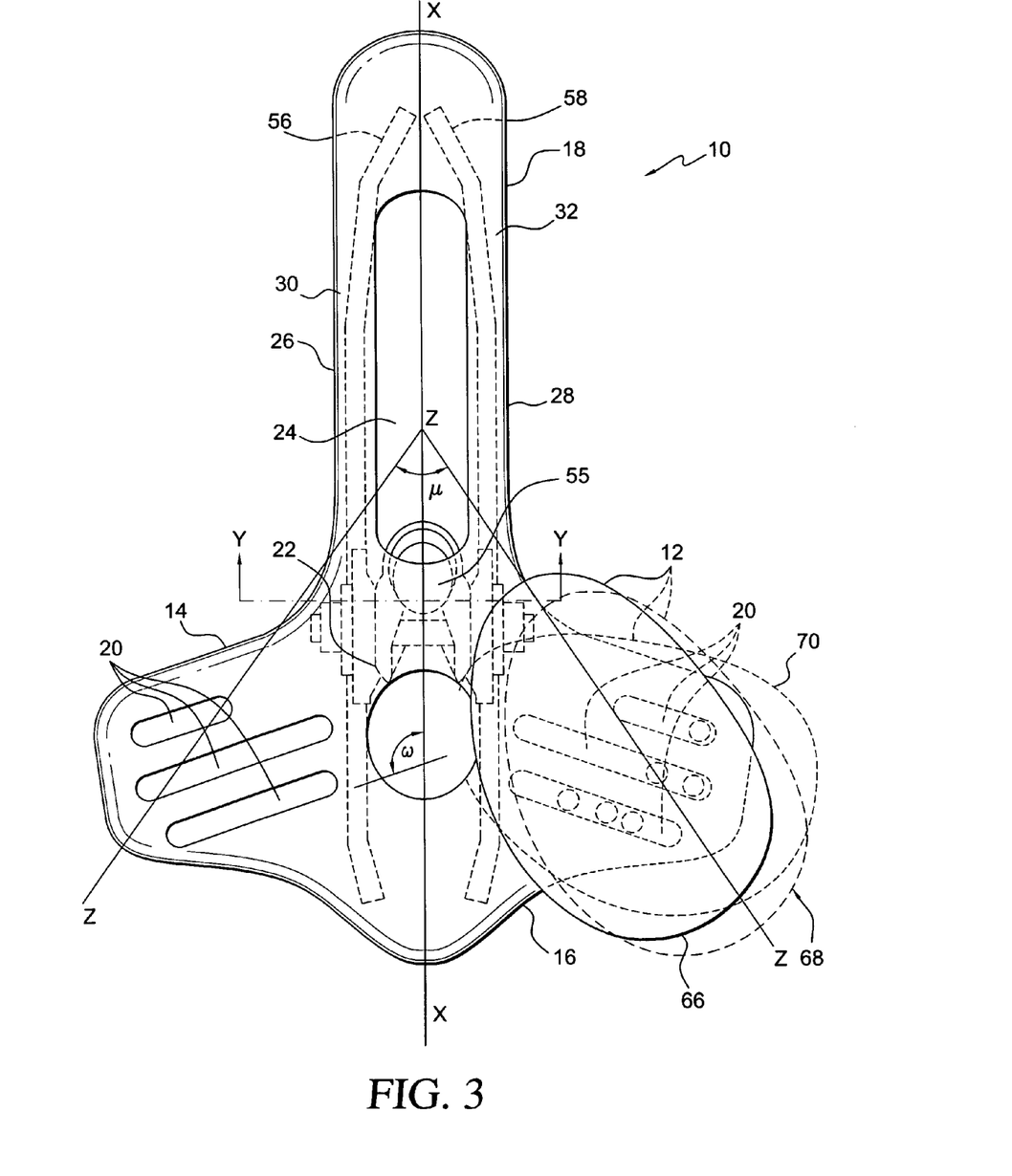
FIG. 3, which is a top plane view of a platform of one embodiment of the assembly according to the present invention.
Figure 4:
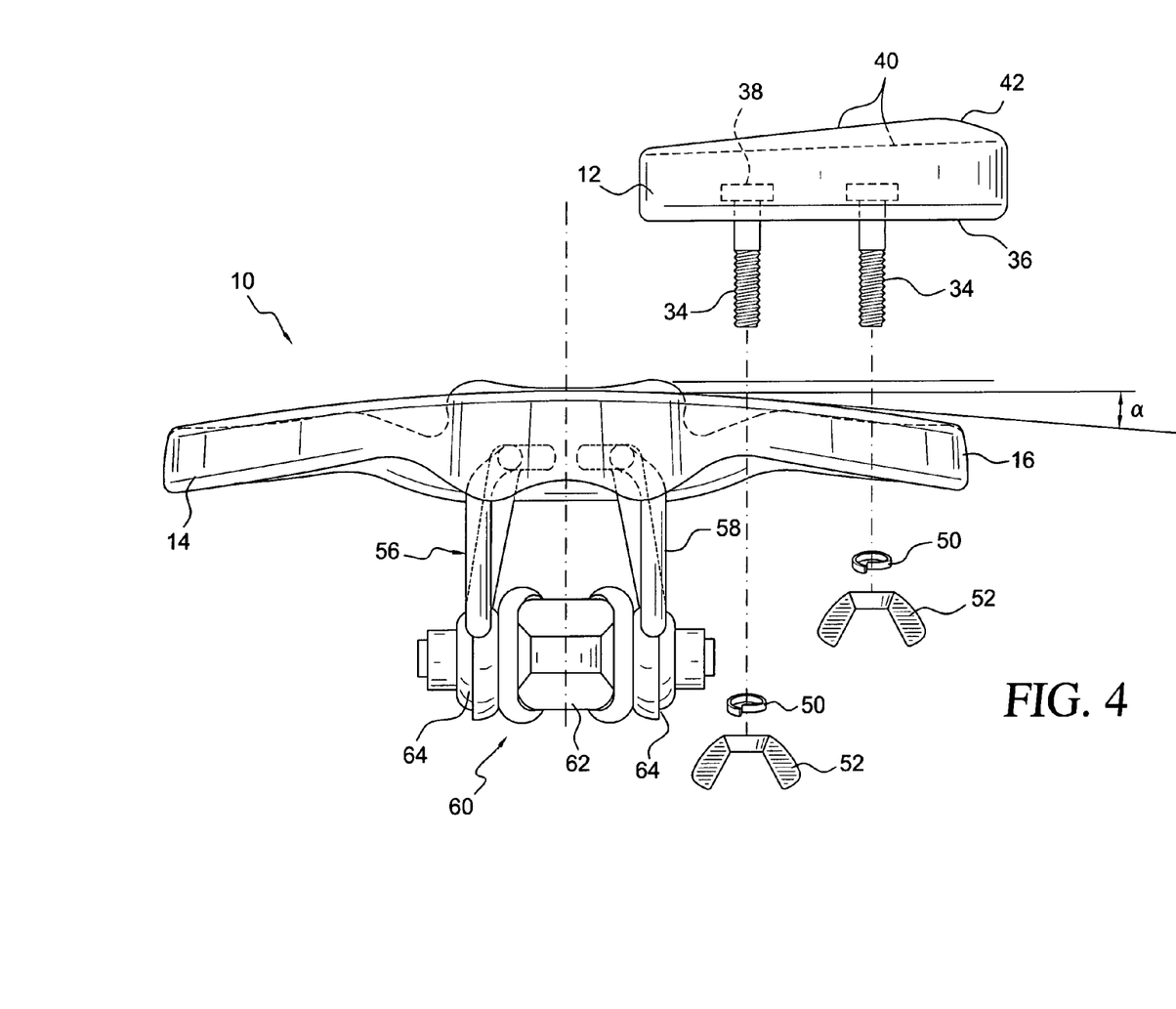
FIG. 4, which is a rear end view of the platform of FIG. 3 with a pod to be assembled onto the right-side of the platform.

When the pods 12 are mounted to a respective platform, the bolts 34 are secured by a lock washer 50 and a nut 52 (FIG. 4). The long axis Z—Z of the pods intersect the horn 18 at the axis X—X to form an angle μ (FIGS. 3 and 10), which varies from 50° to 160°.

Figure 6:
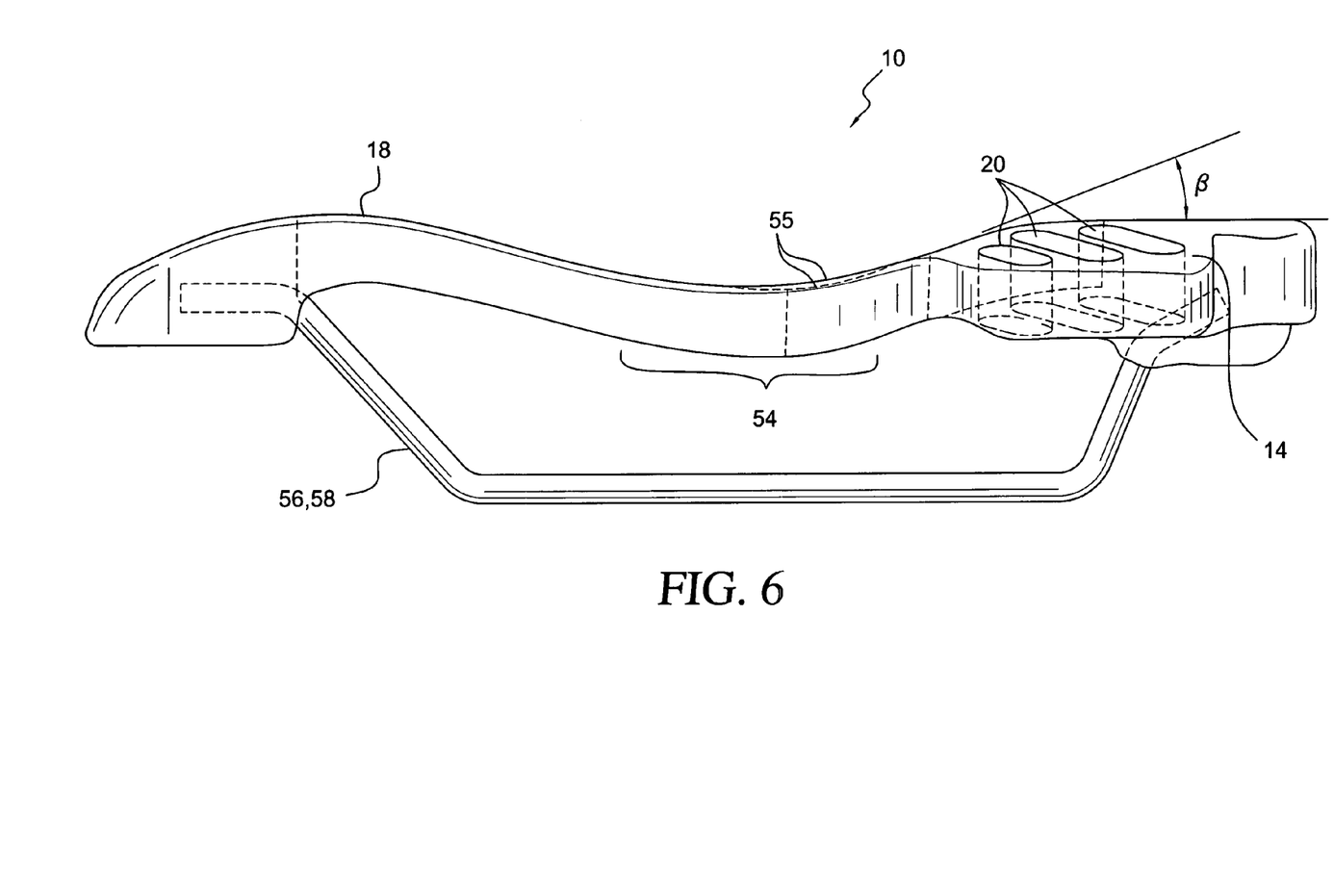
FIG. 6, which is a left-side elevational view of the platform of FIG. 3 with a pod to be assembled to the left-side of the platform.

The anterior portions of the pods 12 are flexible and durable so as to accommodate anterior roll or sliding of the pelvis. As shown in FIG. 6, an extension of the top surface of the platform relative to the posterior surface of the platform toward the rear edge of the platform forms an angle β which is from 7°–20° sloped downward to the ground. This angle leads to the "scooped" (convex) curve 54 of the platform. This "scooped" conformation provides clearance for the soft tissue structures of the perineum which are between the pubic symphysis/ischiopubic rami and the horn of the seat. Anterior portions of the pods 12 need to be flexible so as to conform to the downward inclination of the "scooped" curve. Thus, the flexible anterior aspects of the pods 12, the downward "scoop" formed by the angle β, and the angle μ, permit a natural conformity to the human pelvis whether in an upright position, completely forward (racing) position, or anything in between.

In addition to the angle β, an angle Ω (FIG. 7) allows for slight midline movement/cupping or balance. The angle Ω can vary between 0° to 5°, creating the contour 55.

As shown in FIGS. 3, 4 and 6, the platform 10 is provided with bars 56 and 58 which extend spaced apart transversely and extend horizontally relative to the platform centerline (axis X—X) almost the full length of the platform and are embedded at the anterior portion and posterior portion of the platform as shown in FIG. 6. The bars 56 and 58 provide stiffness to the seat and serve to support the seat assembly on the bicycle seat tube (not shown) with a mounting arrangement 60. The mounting arrangement 60 is adjustable along the bars 56 and 58 and includes a bicycle seat tube engaging bracket 62 situated between bar grasping brackets 64. Between the tube engaging bracket 62 and the bar grasping brackets 64 conforming serration surfaces are provided (not shown) for adjusting the angular relationship of the post engaging bracket and the bar grasping brackets.

Figure 8:
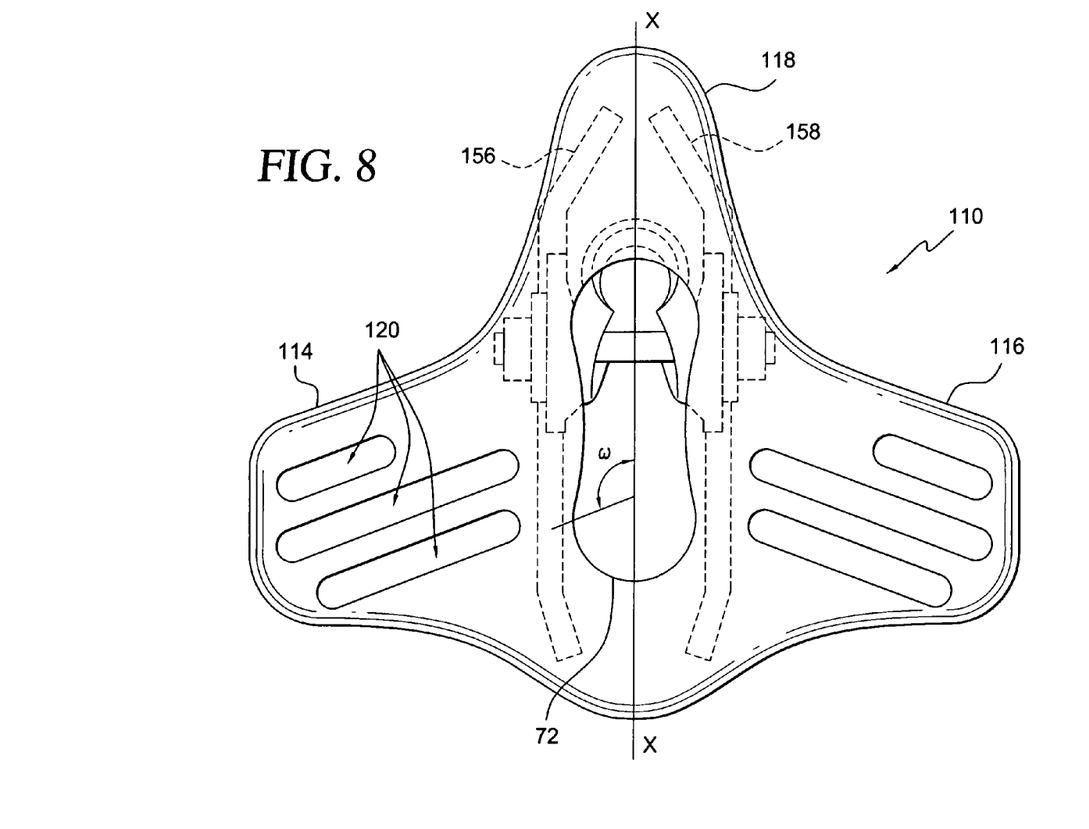
FIG. 8, which is a top plane view of a platform of another embodiment of the assembly according to the present invention.
Figure 9:
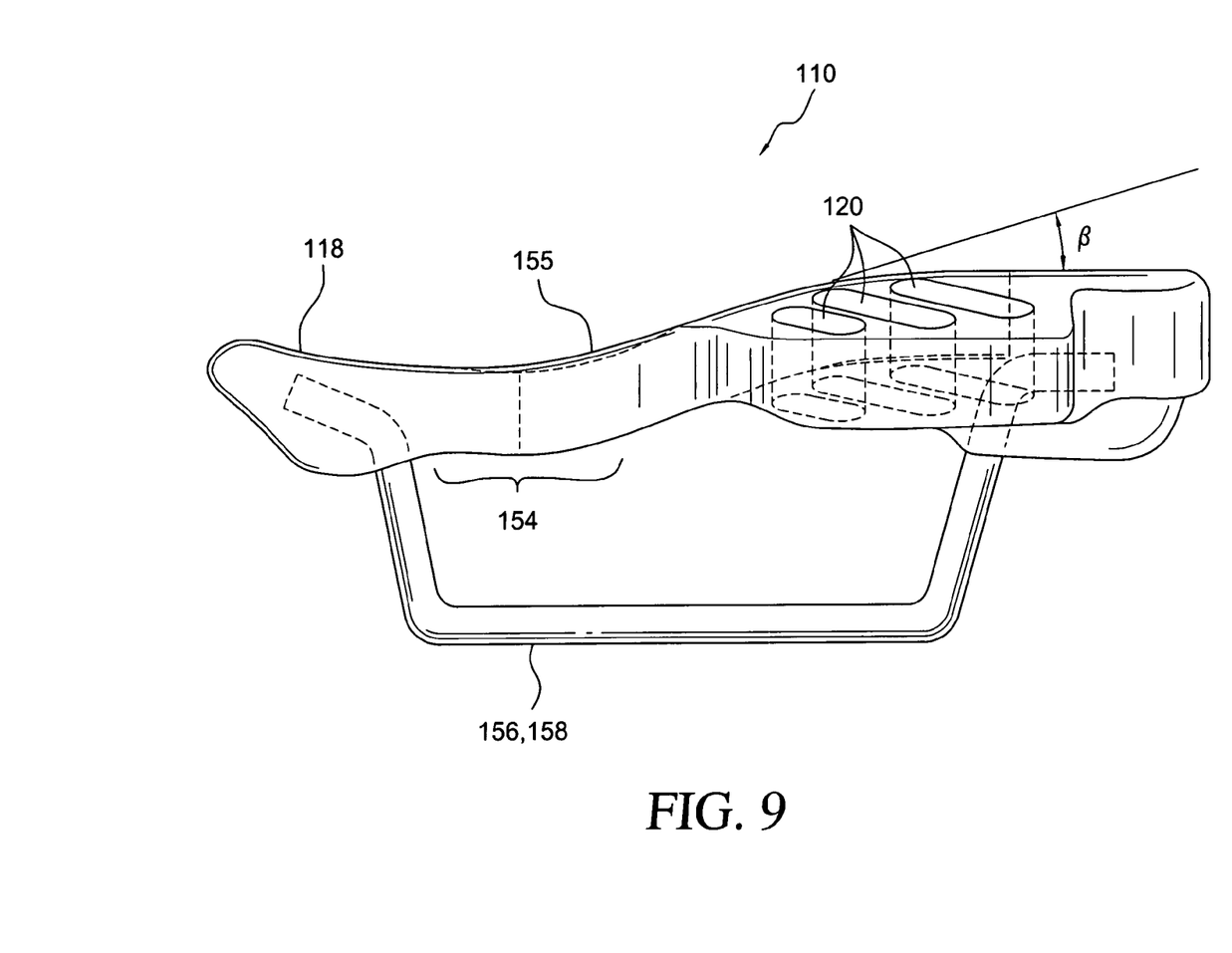
FIG. 9, which is a left-side elevational view of the platform of FIG. 8 with a pod to be assembled.
Figure 10:
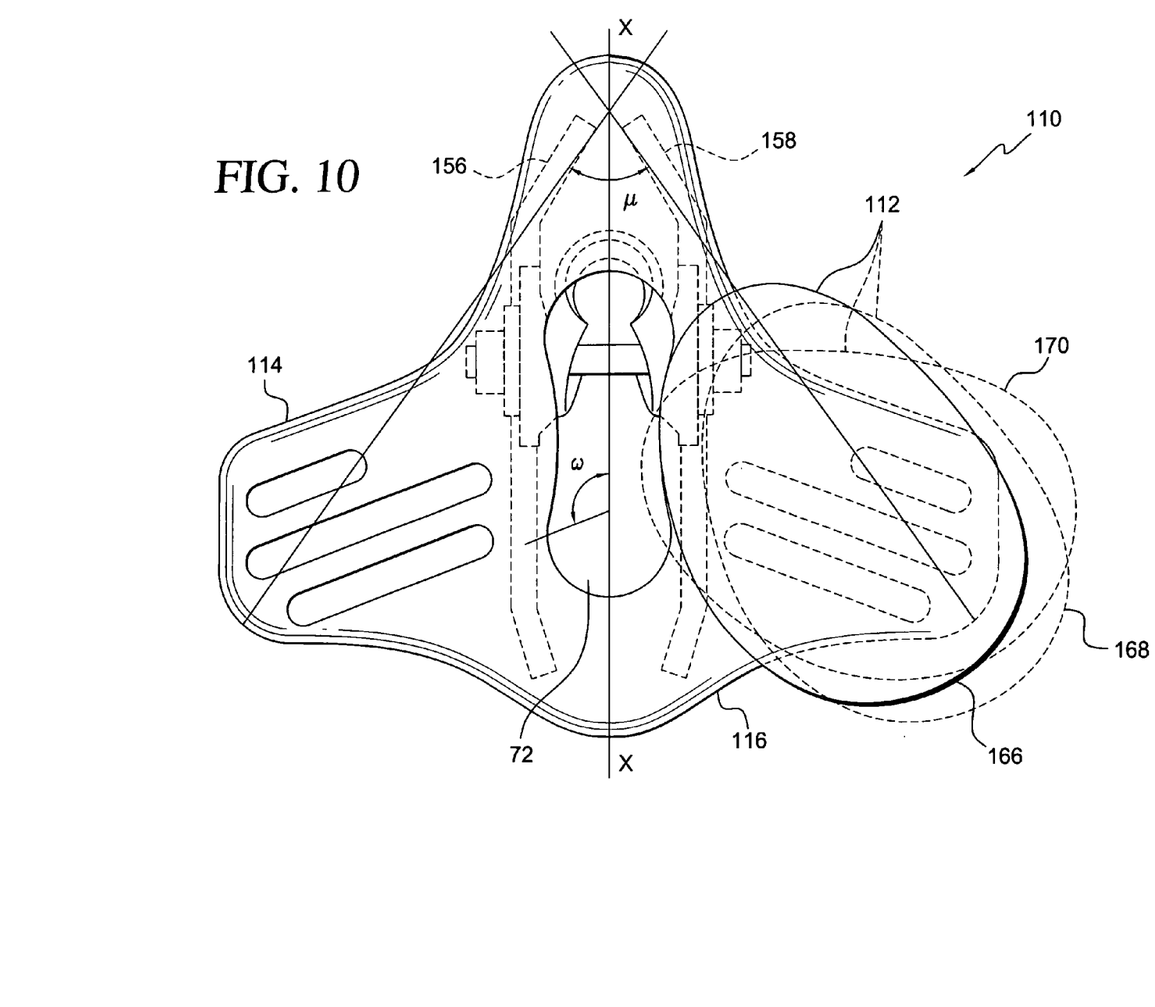
FIG. 10, which is a top plane view of the assembly of FIG. 8 with a pod mounted thereto in various positions. A similar range of positions are available for the platform of FIG. 3.

The further embodiment shown in FIGS. 8–10 is similar to the embodiment previously discussed, except that the horn 118 of the platform 100 is shorter than the horn 18 of platform 10.

To adjust the pods 12, 112, the bolts 34 are loosened and the pod adjusted medially or laterally along the slots 20, 120, as shown in FIGS. 3 and 10 (positions 66 and 68 in FIGS. 3 and 166 and 168 in FIG. 10) Pods 12 and 112 can be removed from the slots 20, 120, rotated medially and repositioned in slots 20 and 120 (position 70 in FIGS. 3 and 170 in FIG. 10). In this new position, the pods can provide greater lateral support to accommodate a wider buttock. While in position 70, 170, medial and lateral movement of the pods can still be achieved. Medial, lateral, rotational, forward and aft adjustments allow for optimal positioning of the pods. Once adjusted, the bolts 34 are tightened to firmly secure the pods to their respective wing and the bicycle is then ready to be mounted by the rider.

Both wings 14 and 16 slope downwardly through an angle α (FIG. 4). The pods are mounted to the wing so that its surface 36 is engaged flush with the top surface of the wing. This causes the pod to be canted downwardly by the angle α. The top surface of the pod is, however, contoured so as to accommodate this angle. One of the purposes of the angle α is to facilitate the molding of the platform. The range of the angle α is typically 0–7 degrees.

Figure 5B:
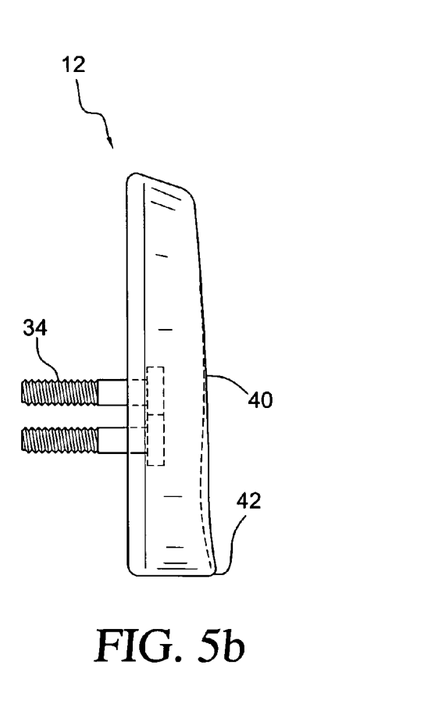
Figure 5C:
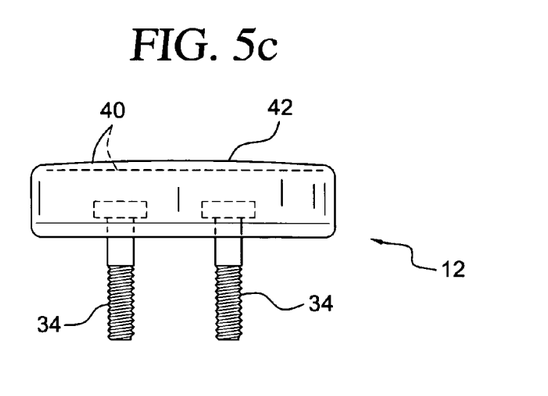
Figure 7:
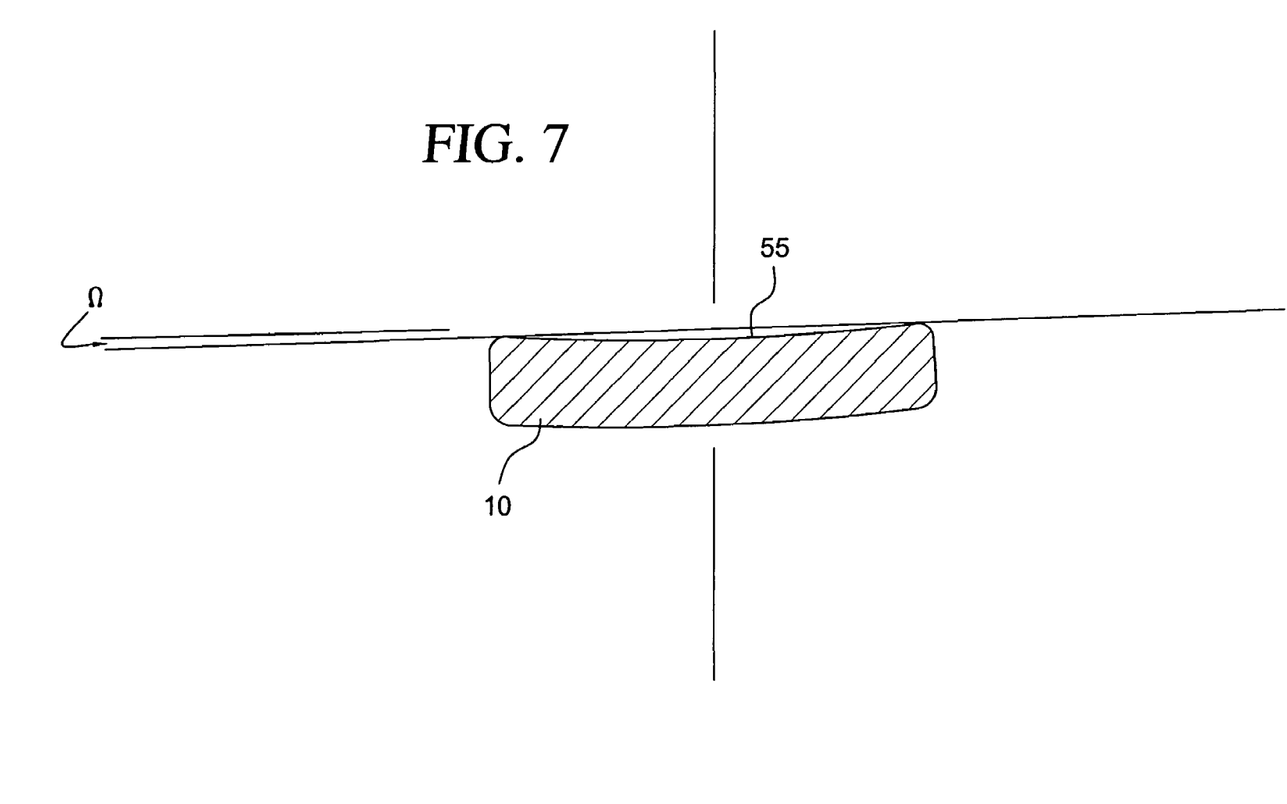
FIG. 7, which is a cross sectional view of the platform in its transverse direction (along line Y—Y of FIG. 3)

In the embodiment shown in FIGS. 8–10, the slot 72 replaces the slot 24 and opening 22 which are combined as slot 72. The slot 72 is positioned further back of the platform 110 because the horn 118 is shortened. Aside from the above noted distinction, the embodiment shown in FIGS. 8–10 is like that shown in FIGS. 3, 4 and 6. The pods of FIGS. 5 and 7 are used with either embodiment.

With either embodiment, a bicycle seat assembly is provided according to which the pod is adjustable through a wide range to accommodate the rider. The adjustment is made that comfort is maximized.

What is claimed is:

1. A bicycle seat assembly, comprising:
   a platform defining a centerline, the platform being symmetrical relative to its centerline, and having an anterior portion and a posterior portion along its centerline with the posterior portion having a width greater than the anterior portion, and the posterior portion defining a pair of wings extending transversely outwardly and in opposite directions from the platform centerline, each wing including at least two elongated slots;
   a pod mounted to each wing, each pod including at least two spaced apart bolts extending outwardly therefrom; and
   mounting means for mounting each said pod to its respective wing, said mounting means including said at least two spaced apart bolts for reception in at least one of said at least two elongated slots of its respective wing, so that each pod can be independently adjusted relative to its respective wing to achieve medial, lateral, forward, aft and rotational adjustment with respect to the platform.

2. The bicycle seat assembly as defined in claim 1, further comprising:
   a pair of bars which extend spaced apart transversely and longitudinally relative to the platform centerline and are attached to said platform; and
   a mounting arrangement situated on and adjustable relative to said pair of bars, said mounting arrangement being adapted to mount the platform to a bicycle.

3. The bicycle seat assembly as defined in claim 2, wherein:
   each bar of said pair of bars has an elongated section and a connecting section at each end which extend upwardly relative to said elongated section and are fastened to said platform, and
   said mounting arrangement extending between said pair of bars.

4. The bicycle seat assembly as defined in claim 3, wherein:
   said mounting arrangement includes a bar grasping bracket engaging each bar and a bicycle engaging bracket connected adjustably to said bar grasping brackets.

5. The bicycle seat assembly as defined in claim 1, wherein:
   said platform defines an elongated slot which extends in the direction of the platform centerline.

6. The bicycle seat assembly as defined in claim 5, wherein:
   the human pelvis includes a pubic symphysis; and
   said elongated slot has a width which is a function of the breadth of a pubic symphysis of the human pelvis and soft tissues of perineum.

7. The bicycle seat assembly as defined in claim 5, wherein:
   said anterior portion defines a horn; and
   said elongated slot defines a pair of rails adjacent thereto formed by said horn, and
   said elongated slot has a width which is greater than the width of said pair of rails combined.

8. The bicycle seat assembly as defined in claim 1, wherein:
   each pod includes a flexible anterior portion, a flexible posterior portion and a harder portion in between for supporting said at least one bolt.

9. The bicycle seat assembly as defined in claim 1, wherein:
   each pod defines a long axis and includes a bottom surface, and
   said at least two bolts define an axis forming an acute angle relative to said long axis.

10. The bicycle seat assembly as defined in claim 9, wherein:
    each pod includes a flexible anterior portion, a flexible posterior portion and a harder portion in between for supporting said at least two bolts.

11. The bicycle seat assembly as defined in claim 1, wherein:
   each pod defines a long axis and includes a bottom surface, and
   the intersection of said long axis of the each pod at the centerline of said platform forms an angle between the intersecting axes which extends between 50° to 160°.

12. The bicycle seat assembly as defined in claim 1, wherein:
   each pod defines a generally concave portion which extends between said posterior portion and said anterior portion.

13. The bicycle seat assembly as defined in claim 12, wherein:
   an extension of said concave portion relative to a surface of said posterior portion of said platform forms an angle of between 7° to 20°.

14. The bicycle seat assembly as defined in claim 1, wherein
   each wing extends downwardly in the transverse direction with respect to the platform centerline.

* * * * *